(12) United States Patent
Shaw et al.

(10) Patent No.: US 11,582,489 B2
(45) Date of Patent: Feb. 14, 2023

(54) TECHNIQUES FOR VIDEO COMPRESSION

(71) Applicants: Purdue Research Foundation, West Lafayette, IN (US); Hewlett-Packard Development Company, L.P., Houston, TX (US)

(72) Inventors: Mark Shaw, Meridian, ID (US); Albert Parra, West Lafayette, IN (US); Jan Allebach, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 443 days.

(21) Appl. No.: 16/205,907

(22) Filed: Nov. 30, 2018

(65) Prior Publication Data

US 2019/0116383 A1   Apr. 18, 2019

Related U.S. Application Data

(63) Continuation of application No. 14/391,242, filed as application No. PCT/US2012/048514 on Jul. 27, 2012, now Pat. No. 10,148,982.

(51) Int. Cl.
*H04N 19/85* (2014.01)
*H04N 19/139* (2014.01)
*H04N 19/172* (2014.01)
*H04N 19/117* (2014.01)
(Continued)

(52) U.S. Cl.
CPC ........... *H04N 19/85* (2014.11); *H04N 19/117* (2014.11); *H04N 19/139* (2014.11); *H04N 19/14* (2014.11); *H04N 19/172* (2014.11); *H04N 19/186* (2014.11)

(58) Field of Classification Search
CPC ...... H04N 19/61; H04N 19/176; H04N 19/51; H04N 19/46; H04N 19/70; H04N 19/105; H04N 19/139; H04N 19/103; H04N 19/186

See application file for complete search history.

(56) References Cited

U.S. PATENT DOCUMENTS

| 8,284,837 B2 | 10/2012 | Yin et al. |
| 10,148,982 B2 | 12/2018 | Shaw et al. |
| 2005/0207495 A1 | 9/2005 | Ramasastry et al. |

(Continued)

FOREIGN PATENT DOCUMENTS

CN          101023673        8/2007

OTHER PUBLICATIONS

"Perceptual Video Processing: A New Approach to Enhanced Compression Efficiency," White Paper, 2010, pp. 1-10, Motorola, Inc.

(Continued)

*Primary Examiner* — Farhan Mahmud
(74) *Attorney, Agent, or Firm* — Quarles & Brady LLP

(57) ABSTRACT

A method is disclosed. In the method, color differences are calculated between a current video frame and a motion predicted version of the current video frame based on a human visual system's ability to perceive the color differences. Also, information in a difference frame is discarded based on the color differences. The difference frame includes differences between the current video frame and the motion predicted version of the current video frame.

20 Claims, 4 Drawing Sheets

(51) Int. Cl.
  *H04N 19/14*  (2014.01)
  *H04N 19/186*  (2014.01)

(56) References Cited

U.S. PATENT DOCUMENTS

| | | |
|---|---|---|
| 2006/0088102 A1 | 4/2006 | Lee et al. |
| 2007/0217507 A1 | 9/2007 | Kazui et al. |
| 2010/0149344 A1 | 6/2010 | Ferguson |
| 2010/0172411 A1* | 7/2010 | Efremov .............. H04N 19/136 375/240.12 |
| 2010/0183069 A1 | 7/2010 | Chen et al. |
| 2011/0103476 A1 | 5/2011 | Demos |
| 2011/0103478 A1 | 5/2011 | Demos |
| 2011/0129016 A1 | 6/2011 | Sekiguchi et al. |
| 2011/0255589 A1 | 10/2011 | Saunders et al. |
| 2012/0044990 A1 | 2/2012 | Bivolarsky et al. |
| 2015/0334422 A1 | 11/2015 | Shaw et al. |

OTHER PUBLICATIONS

Motion-Compensated Residue Preprocessing in Video Coding Based on Just-Noticeable-Distortion Profile.

* cited by examiner

100

200

300

400

TECHNIQUES FOR VIDEO COMPRESSION

BACKGROUND

Compression of video data is becoming more and more essential today's information age. Video content is growing at an alarming rate, and the bandwidth requirements to support such video content are staggering.

DETAILED DESCRIPTION

Figure 1:
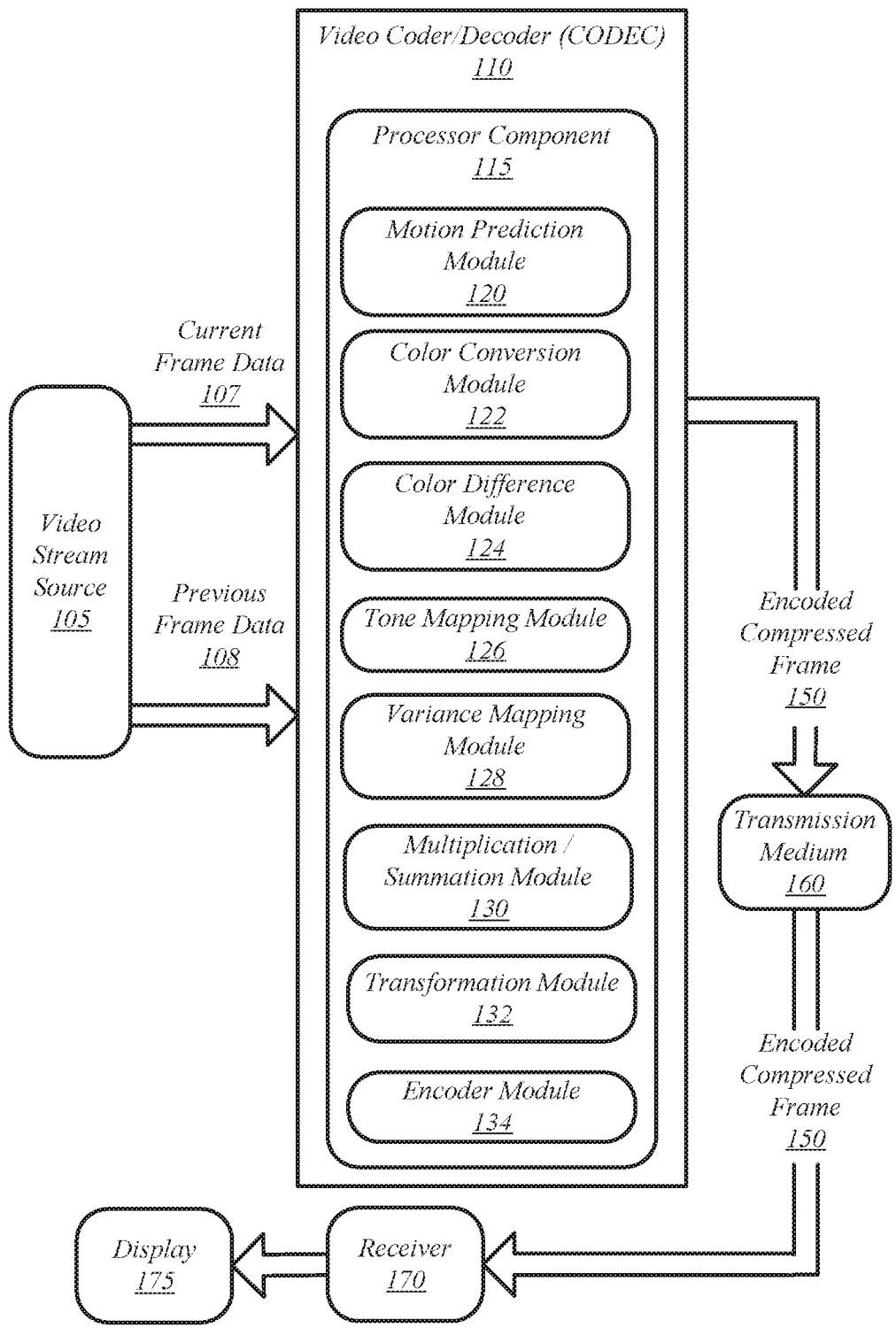
FIG. 1 illustrates one example of a video coder/decoder (CODEC) according to an embodiment.

Disclosed are techniques to selectively modify a video stream using a color contrast sensitivity model based on the human visual system. A video stream may be characterized as a sequence of frames that when presented sequentially provide a motion aspect to the images of the frames. Embodiments of the color contrast sensitivity model can identify regions of high variance with frame to frame differences that are visually imperceptible to a human observer with normal color vision. The color contrast sensitivity model is based on the perception principles of color science, and further takes advantage of the nature of block-based progressive video coding techniques.

The embodiments described herein selectively discard inter-frame differences based on underlying assumptions about the human visual system for a video CODEC such as, for instance an MPEG-2 CODEC.

MPEG-2 is a standard for the generic coding of moving pictures (e.g., a video stream) and associated audio information. MPEG-2 describes a combination of lossy video compression and lossy audio data compression methods which permit storage and transmission of video streams using currently available storage media and transmission bandwidth.

A human observer's sensitivity to color differences varies as a function of hue, chroma and lightness. By taking this into account, the embodiments described herein selectively attenuate inter-frame differences of a video stream based on a variance weighted chromatic activity map. In the case of an MPEG 2 workflow, the attenuated differences may then be transformed using, for instance, a discrete cosine transformation (DCT), and quantized. A discrete cosine transform (DOT) expresses a sequence of finitely many data points in terms of a sum of cosine functions oscillating at different frequencies. DCTs are important to numerous applications including lossy compression of audio and images where small high-frequency components can be discarded.

The transformed, quantized video frame data may then be encoded using, for example, a Huffman coding algorithm. Huffman coding is an encoding algorithm that may be used for lossless data compression. Huffman coding refers to the use of a variable-length code table for encoding a source symbol where the variable-length code table has been derived in a particular way based on the estimated probability of occurrence for each possible value of the source symbol.

Other video coding techniques may be used in place of MPEG-2 which may utilize different transformation and encoding schemes. The embodiments are not limited to this example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates one example of video coder/decoder (CODEC) 110 according to an embodiment. The video CODEC 110 may include multiple modules under control of a processor component 115. The multiple modules may include a motion prediction module 120, a color conversion module 122, a color difference module 124, a tone mapping module 126, a variance mapping module 128, a multiplication and summation module 130, a transform module 132, and an encoder module 134.

Standardized video coding frameworks have been developed by the International Telecommunication Union (ITU) and the Moving Picture Experts Group (MPEG). Within these frameworks, the structure of the decoder is clearly defined, but the techniques by which the encoder creates the video stream is left to the discretion of the author of the encoder.

In the embodiments described herein, an approach to pre-processing a video stream is described that incorporates principles of color science for still images and a variance based weighting to account for the impact of motion. Most color difference models have been developed using uniform, solid patches of color. Applying these models to moving images (e.g., a video stream) introduces a new dimension (e.g., motion) not accounted for by existing color difference models.

The motion prediction module 120 may be used to predict or estimate motion vectors. The motion prediction module 120 may use, for example, a block matching Motion Estimation (ME) algorithm to determine the motion vectors from frame to frame to create a motion predicted frame. This shift is represented by a motion vector.

Motion compensation exploits the fact that, often, for many frames of a video stream, the only difference between one frame and the next may be the result of either the camera moving or an object in the frame moving. In reference to a video file, this means much of the information that represents one frame will be the same as the information used in the next frame. A frame may be comprised of a number of blocks. Each block within a frame may be predicted from a block of equal size in the reference frame. The blocks are not transformed in any way apart from being shifted to the position of the predicted block. This shift is represented by a motion vector. Many motion compensation schemes allow for the use of a number of different previous or subsequent frames to be used for the motion prediction and not necessarily just an adjacent frame.

Using motion compensation, a video stream may contain some full (reference) frames. The other frames may contain only difference information needed to transform the previous frame into the next frame. To exploit the redundancy between neighboring block vectors, it is common to encode only the difference between the current and previous motion vector in the bit-stream. Further down the encoding pipeline, an entropy coder (e.g., a Huffman coder) may take advantage of the resulting statistical distribution of the motion vectors around the zero vector to reduce the output size.

Inter-frame video coding takes advantage of the fact that not every pixel within a video stream may change from one frame to the next. By removing the redundancy of unchanging pixels, the video stream may only code those pixels that change from frame to frame. This results in a significant improvement in the bit rate (e.g., the amount of data needed to encode the video stream frames).

One of the underlying assumptions is that the pixel differences to be encoded from frame to frame are perceptually significant. However, not all color differences are equally likely to be perceived since the human visual system's sensitivity to changes in color varies as a function of lightness, chroma and hue.

More recent developments in color science have led to the standardization of color difference equations, known as the CIE $\Delta E_{ab}$, $\Delta E_{94}$ and most recently $\Delta E_{2000}$ equations. In order to use such a color difference model, the colors to be compared must be converted using the color conversion module 122 from the source color space into a perceptual color space, such as, for example, CIE Lab.

The CIE Lab color space is a perceptual color space with dimension L for lightness and color-opponent dimensions a and b. The CIE Lab color space is derived from a "master" CIE 1931 XYZ color space. The CIE 1931 XYZ color space predicts which spectral power distributions will be perceived as the same color, but is not perceptually uniform. CIE Lab creates a space that can be computed from the XYZ space and is more perceptually uniform. Perceptually uniform means that a change of the same amount in a color value should produce a change of about the same visual importance. When storing colors in limited precision values, this can improve the reproduction of tones. The CIE Lab space is defined relative to a reference white point of the XYZ data from which the Lab values were converted.

The human eye has photoreceptors for medium- and high-brightness color vision, with sensitivity peaks in short (S, 420-440 nm), middle (M, 530-540 nm), and long (L, 560-580 nm) wavelengths (there are also low-brightness, monochromatic "night-vision" receptors, called rod cells, which have peak sensitivity around 490-495 nm). Thus, in principle, three parameters referred to as tristimulus values can describe a color sensation. These tristimulus values of a color can be conceptualized as the amounts of three primary colors in a tri-chromatic additive color model. Associating tristimulus values with colors is the job of a color space. CIE XYZ, one of many such spaces, is a commonly used standard, and serves as the basis from which many other color spaces are defined. A color-matching function associates specific tristimulus values with specific colors.

The color conversion module 122 may model the perception of a human observer with normal, two degree color vision using, for example, a simplified form of the CIE Lab equations shown in equations 1-3 below, where X, Y, Z are the tristimulus values of the color under observation, and $X_n$, $Y_n$, $Z_n$ are the tristimulus values of the reference white point. The L*, a*, b* coordinates correspond to the lightness, red-green opponent channel, and blue-yellow opponent channel respectively.

$$L^* = 116\left(\frac{Y}{Y_n}\right)^{\frac{1}{3}} - 16 \quad \text{Eq. (1)}$$

$$a^* = 500\left[\left(\frac{X}{X_n}\right)^{\frac{1}{3}} - \left(\frac{Y}{Y_n}\right)^{\frac{1}{3}}\right] \quad \text{Eq. (2)}$$

$$b^* = 200\left[\left(\frac{Y}{Y_n}\right)^{\frac{1}{3}} - \left(\frac{Z}{Z_n}\right)^{\frac{1}{3}}\right] \quad \text{Eq. (3)}$$

The embodiments are not limited to this example.

For a pixel in the video stream, once CIE Lab coordinates (L*, a*, b*) have been computed for two (2) different samples, a color difference may be computed by the color difference module 124 using color difference equations. The $\Delta E_{94}$ and $\Delta E_{2000}$ equations may be used because they attempt to account for the non-linear dependency on hue and chroma of the samples. The $\Delta E_{94}$ color difference equation, for example, may be calculated using equation 4 below.

$$\Delta E_{94} = \sqrt{\left(\frac{\Delta L^*}{K_L}\right)^2 + \left(\frac{\Delta C^*_{ab}}{1 + K_1 C^*_1}\right)^2 + \left(\frac{\Delta H^*_{ab}}{1 + K_2 C^*_2}\right)^2} \quad \text{Eq. (4)}$$

where:

$\Delta L^* = L^*_1 - L^*_2$ $C^*_1 = \sqrt{a^{*2}_1 + b^{*2}_1}$ $C^*_2 = \sqrt{a^{*2}_2 + b^{*2}_2}$ $\Delta C^*_{ab} = C^*_1 - C^*_2$ $\Delta H^*_{ab} = \sqrt{\Delta E^{*2}_{ab} - \Delta L^{*2} - \Delta C^{*2}_{ab}} = \sqrt{\Delta a^{*2} + \Delta b^{*2} - \Delta C^{*2}_{ab}}$ $\Delta a^* = a^*_1 - a^*_2$ $\Delta b^* = b^*_1 - b^*_2$ and further where the weighting factors ($K_L$, $K_1$, $K_2$) depend on the application (i.e., nature and content of a video stream). The embodiments are not limited to this example.

Next a weighting may be used to perturb the inter-frame differences based on the colorimetric properties of the frames under analysis. The weighting function may be implemented by the tone mapping module 126. The tone mapping module 126 may map input color difference values to a normalized output between zero (0) and one (1). A weighting of one (1) may mean that color differences are preserved while a weighting of zero (0) may mean that color differences may be discarded. The tone mapping weighting function may be a tunable parameter that influences the bit rate and quality of a resulting video stream.

Figure 2:
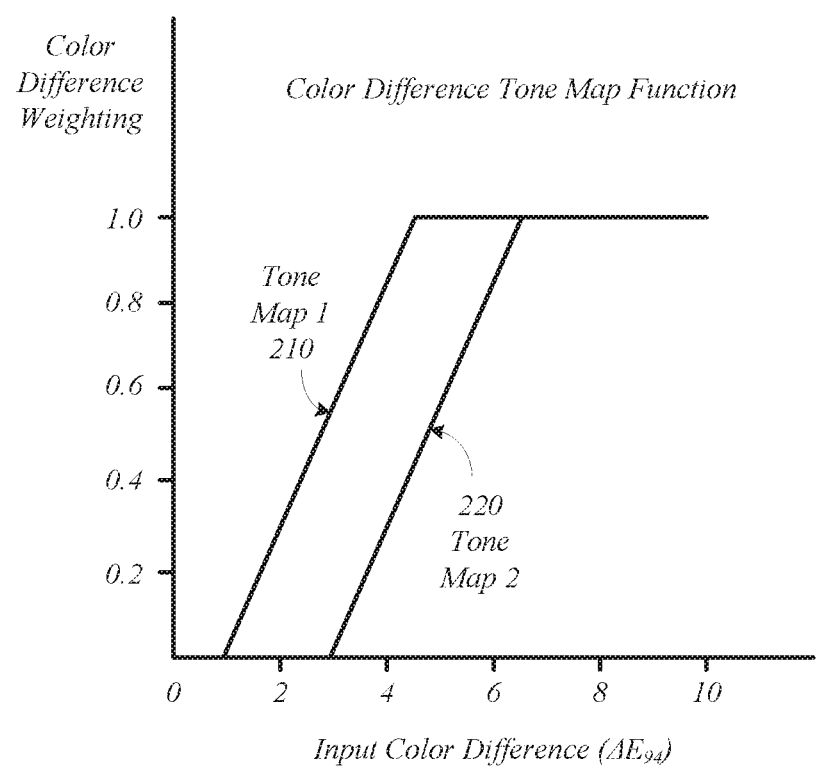
FIG. 2 illustrates an embodiment of a color difference tone map function according to an embodiment.

FIG. 2 illustrates a sample color difference tone map function 200 having two (2) different tone maps. Tone map 1 210 indicates that smaller color differences as determined by a smaller input color difference value may be preserved more than color differences associated with tone map 2 220. For example, tone map 1 210 reaches a fully preserved weighting factor of one (1) at a color difference value of four (4) while tone map 2 220 does not reach a fully preserved weighting factor of one (1) until a color difference value of six (6). Other tone maps may be utilized based on the nature and content of the video stream.

Referring back to FIG. 1, the multiplication and summation module 130 may initially calculate the difference between the current frame ($X_{k+1}$) and the motion predicted frame to obtain a $\Delta$frame. The multiplication and summation module 130 may then multiply the Δframe with the tone mapped color difference image $T_{map}$ generated by the tone mapping module 126 on a pixel by pixel basis to obtain a weighted Δframe. The multiplication and summation module 130 may then take the difference between the Δframe and the weighted Δframe (e.g., tone mapped response) to obtain a Δ loss.

The variance mapping module 128 may calculate a spatial variance map ($C_{map}$) by color converting the motion predicted frame using the color conversion module 122. Δloss is then multiplied by the spatial variance map ($C_{map}$) of the motion predicted frame. The resulting image, called the Δ preservation map represents the variance of the pixels that are to be preserved in the encoding process.

The multiplication and summation module 130 may then sum, pixel by pixel, the tone mapped response of the weighted Δframe with the Δpreservation map to obtain a modified Δframe. The modified Δframe may then be forwarded to the transform module 132 where it may be subjected to a discrete cosine transformation and quantization process.

The result of the transform module 132 may then be forwarded to the encoder module 134 where it may be encoded. The result of the encoder module 134 may be encoded frame data 150 that may be forwarded to a transmission medium 160 for delivery to a receiver device 170. The receiver device 170 may include a video decoder capable of converting the coded frame data into a visually perceptible format. The receiver device 170 may also include or be coupled with a display device 175 capable of presenting the video stream in a visually perceptible manner.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
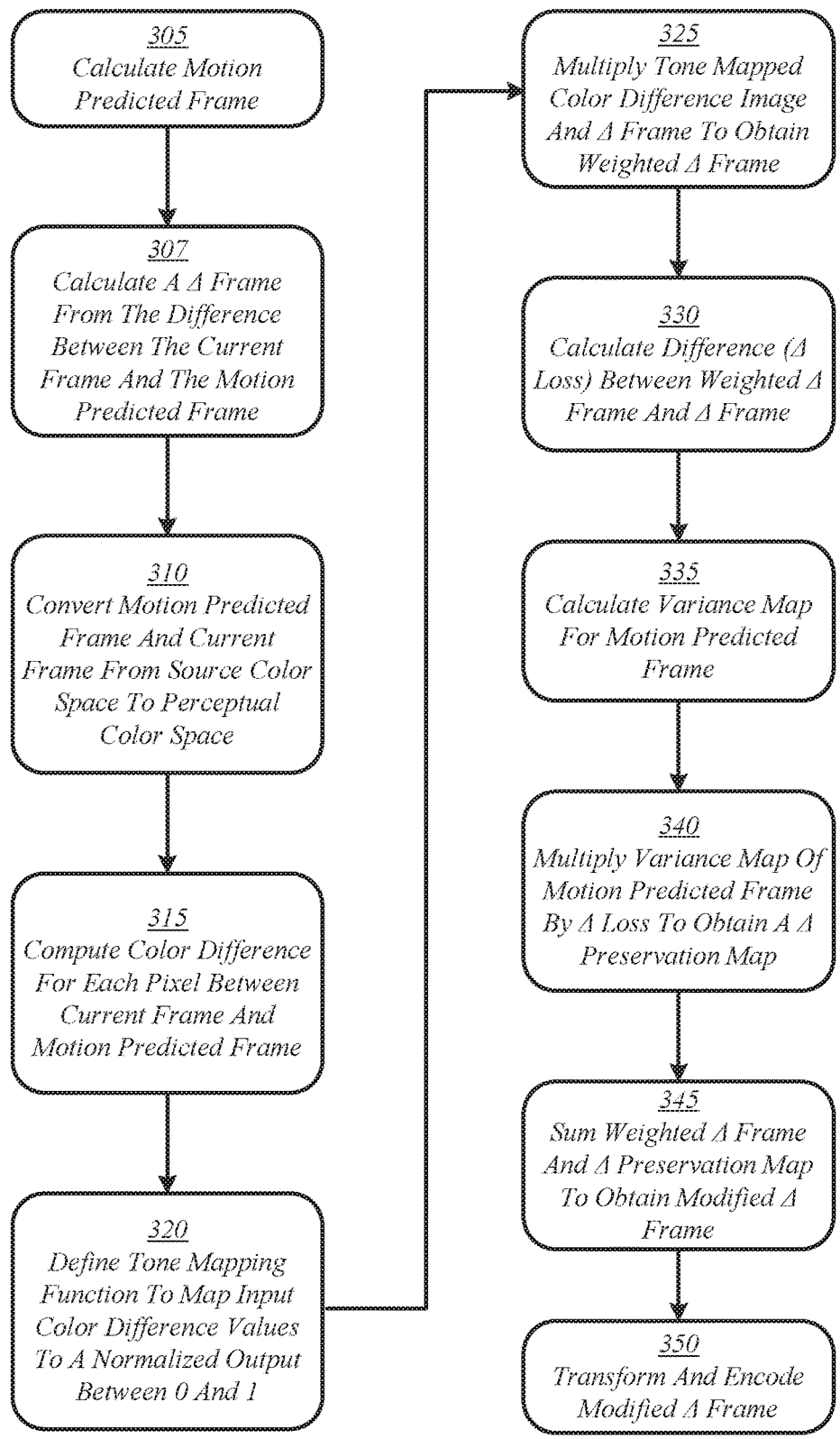
FIG. 3 illustrates an embodiment of a logic flow according to an embodiment.

FIG. 3 illustrates an embodiment of a logic flow 300. The logic flow 300 may be representative of some or all of the operations executed by one or more embodiments described herein.

In the illustrated embodiment shown in FIG. 3, the logic flow 300 may calculate a motion predicted frame at block 305. For example, video CODEC 110 may receive current frame data 107 and reference frame data 108 from a video stream source 105. The motion prediction module 120 under control of processor component 115 may, for example, perform a block matching Motion Estimation (ME) algorithm (described above) to determine the motion vectors from blocks within the current frame to corresponding blocks within the reference frame to create a motion predicted block for the frame. This may be done for all the blocks of the current and reference frames to create a motion predicted frame. The embodiments are not limited to these examples.

In the illustrated embodiment shown in FIG. 3, the logic flow 300 may determine a Δframe by calculating the difference between each pixel in the current frame and each corresponding pixel in the motion predicted frame at block 307. For example, the multiplication and summation module 130 under control of processor component 115 may take the difference between each pixel in the current frame and each corresponding pixel in the motion predicted frame. The embodiments are not limited to these examples.

In the illustrated embodiment shown in FIG. 3, the logic flow 300 may convert the motion predicted frame of video data and the current frame of video data from a source color space to a perceptual color space wherein each frame of video data may include multiple pixels at block 310. For example, the color conversion module 122 under control of processor component 115 may utilize a form of the CIE Lab equations shown in equations 1-3 above, where X, Y, Z are the tristimulus values of the color under observation, and $X_n$, $Y_n$, $Z_n$ are the tristimulus values of the reference white point. The embodiments are not limited to these examples.

In the illustrated embodiment shown in FIG. 3, the logic flow 300 may determine a color difference for each pixel between current frame and motion predicted frame at block 315. For example, the color difference module 124 under control of processor component 115 may use, for example, the $\Delta E_{94}$ or $\Delta E_{2000}$ color difference equations because they attempt to account for the non-linear dependency on hue and chroma of the samples. The $\Delta E_{94}$ color difference equation, for example, may be calculated using equation 4 above. The embodiments are not limited to these examples.

In the illustrated embodiment shown in FIG. 3, the logic flow 300 may map the input color difference values to a normalized output between zero (0) and one (1) for each pixel to create a tone mapped color difference image at block 320. For example, the tone mapping module 126 under control of processor component 115 may determine a weighting to perturb the inter-frame differences based on the colorimetric properties of the frames under analysis. The tone mapping module 126 may map input color difference values to a normalized output between zero (0) and one (1). A weighting of one (1) may mean that color differences are preserved while a weighting of zero (0) may mean that color differences may be discarded. The tone mapping weighting function may be a tunable parameter that influences the bit rate and quality of a resulting video stream. The embodiments are not limited to these examples.

In the illustrated embodiment shown in FIG. 3, the logic flow 300 may multiply tone mapped color difference image and Δframe to obtain a weighted Δframe at block 325. For example, the multiplication and summation module 130 under control of processor component 115 may multiply the Δframe with the tone mapped color difference image $T_{map}$ generated by the tone mapping module 126 on a pixel by pixel basis to obtain a weighted Δframe. The embodiments are not limited to these examples.

In the illustrated embodiment shown in FIG. 3, the logic flow 300 may calculate a difference (Δloss) between weighted Δframe and Δframe at block 330.

In the illustrated embodiment shown in FIG. 3, the logic flow 300 may calculate a variance map of the motion predicted frame at block 335. For example, the variance mapping module 128 under control of processor component 115 may calculate a spatial variance map ($C_{map}$) by color converting the motion predicted frame using the color conversion module 122. The embodiments are not limited to these examples.

In the illustrated embodiment shown in FIG. 3, the logic flow 300 may multiply the variance map of motion predicted frame by Δloss to obtain a Δpreservation map at block 340. For example, the Δpreservation map may represent the variance of the pixels that are to be modified before the transformation and quantization process.

In the illustrated embodiment shown in FIG. 3, the logic flow 300 may sum weighted Δframe and Δpreservation map to obtain modified Δframe at block 345. For example, the multiplication and summation module 130 under control of processor component 115 may sum, pixel by pixel, the tone mapped response of the weighted Δframe with the Δpreservation map to obtain a modified Δframe. The embodiments are not limited to these examples.

In the illustrated embodiment shown in FIG. 3, the logic flow 300 may transform the modified Δframe at block 350. For example, the transform module 132 under control of processor component 115 may be subjected to a discrete cosine transformation and quantization process. The embodiments are not limited to these examples.

In the illustrated embodiment shown in FIG. 3, the logic flow 300 may encode the transformed and quantized Δframe at block 355. For example, the encoder module 134 under control of processor component 115 may encode the video stream by, for example, a Huffman encoding process. The embodiments are not limited to these examples.

Figure 4:
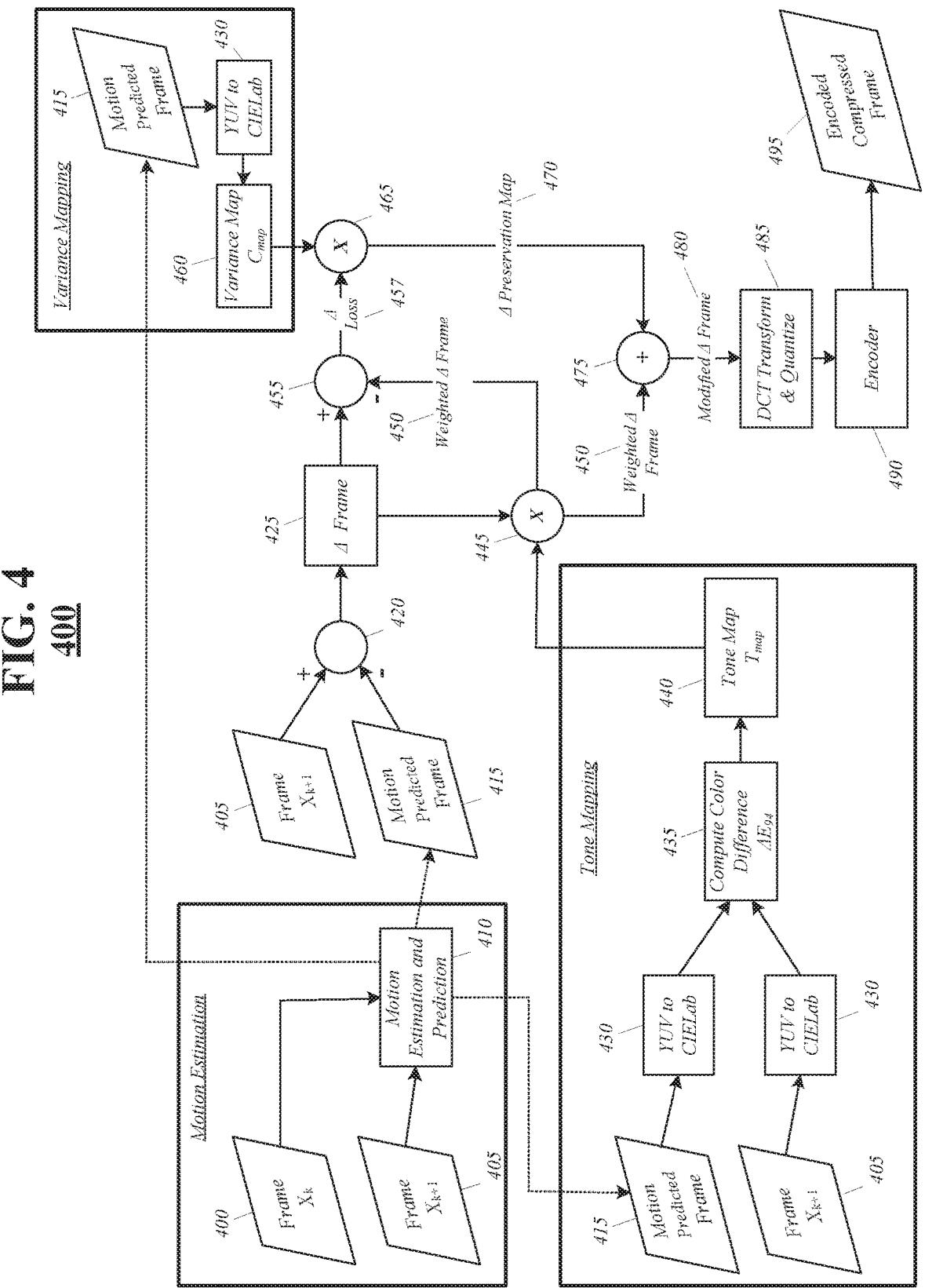
FIG. 4 illustrates one example of a workflow diagram for a video CODEC according to an embodiment.

FIG. 4 illustrates one example of a workflow diagram for a video CODEC 110 according to an embodiment. The workflow may comprise a motion estimation function, a tone mapping function, a variance mapping function, and multiple summation, difference, and multiplication functions. The workflow may receive as input a current frame ($x_{k+1}$) 405 and a reference frame ($x_k$) 400 and determine a modified Δframe 475 that may be encoded for delivery over a transmission medium. The work flow to obtain the modified Δframe 475 is described below. It should be noted that the reference frame may be a preceding frame or other known frame in relation to the current frame.

Initially, the workflow may perform a motion estimation and prediction procedure at block 410 using the current frame 405 and its reference frame 400 as input to create a motion predicted frame 415. The motion estimation and prediction block 410 may use, for example, a Motion Estimation (ME) algorithm to determine the motion vectors from frame to frame to create the motion predicted frame 415. The motion estimation algorithm may also be block based such that blocks within the frame are estimated until all the blocks of a frame have been estimated. Other motion estimation algorithms may be implemented.

The motion predicted frame 415 may then be used to determine the differences with the current frame 405 via difference 420. This results in a Δframe 425.

The motion predicted frame 415 may also be used by the tone mapping function to determine a weighting function. First, the motion predicted frame 415 and current frame 405 are converted from a source color space such as, for instance, YUV to a perceptual color space such as, for instance, CIE Lab at block 430 using the ITU-R Recommendation BT.601 (or REC 601) primary values and respective white point in which the YUV reference [1,0,0], for example, may be assumed to be the white point of the scene or the respective color space for that video coding standard. The embodiments are not limited to these examples.

The YUV model defines a color space in terms of one luminance (Y) component and two chrominance (UV) components. YUV is a color space that encodes a color image or video taking human perception into account. YUV allows for reduced bandwidth for chrominance components. The term YUV is also used to describe file formats that are encoded using YCbCr. YCbCr may be used for digital encoding of color information suited for video compression and transmission such as MPEG.

ITU-R Recommendation BT.601 is a standard published in 1982 by the International Telecommunication Union (ITU)—Radio-communications sector for encoding interlaced analog video signals in digital video form. It includes methods of encoding 525-line 60 Hz and 625-line 50 Hz signals, both with 720 luminance samples and 360 chrominance samples per line. The color encoding system is known as YCbCr 4:2:2. For a pair of pixels, the data are stored in the order Y1:Cb:Y2:Cr, with the chrominance samples co-sited with the first luminance sample.

Once the color data for the motion predicted frame 415 and current frame 405 have been converted to the perceptual color space by, for example, a YUV to CIELab color conversion procedure at block 430, the color differences between each pixel of the motion predicted frame 415 and current frame 405 can be calculated at block 435 using, for example, the $\Delta E_{94}$ color difference equation previously described. The output of the $\Delta E_{94}$ color difference equation yields a tone map ($T_{map}$) 440 of pixel weightings.

The theoretical visual tolerance for a just noticeable difference (JND) for a human observer is considered to be equivalent to one $\Delta E_{94}$ for large area solid color patches. In the present example, small (pixel sized) colors may be changing as a function of time. For that reason, a variable margin of error may be allowed. A tone mapping function may be defined that maps input color difference values for each pixel to a normalized output between zero (0) and one (1).

The tone mapped color difference image $T_{map}$ 440 and the Δframe 425 may then be multiplied pixel by pixel at block 445 to obtain a weighted Δ frame 450. Next, the difference between the Δframe 425 and the tone mapped color difference image $T_{map}$ 440 may be calculated at block 455 and the result termed the Δloss 457.

A spatial variance map ($C_{map}$) 460 may be obtained by color converting the motion predicted frame 415 at block 430. The variance map ($C_{map}$) 460 may then be multiplied at block 465 by Δloss 457. The resulting image, called the Δpreservation map 470 shows the variance of the pixels that will be removed in the encoding process performed later at block 490.

Preservation of the color differences in smooth regions of the frame may be attained by applying a pixel by pixel summation at block 475 of the weighted Δframe 450 and the Δpreservation map 470, yielding a modified Δframe 480. This is possible because the detail and texture of the video stream may be masking the perceptual visibility of the change in the color differences. Therefore, this workflow enables the selective compression of video content based on regions that have small inter-frame color differences and medium to high variance.

The modified Δframe 480 pixels may then be transformed and quantized at block 485 using, for example, an MPEG-2 DCT transformation and quantization scheme, and encoded at blocks 485 and 490 using, for example, Huffman Coding. The end result is an encoded compressed frame 490.

One or more aspects of at least one embodiment may be implemented by representative instructions stored on a non-transitory machine-readable medium which represents various logic within the processor component 115, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein", respectively. Moreover, the terms "first", "second", "third", and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A non-transitory computer-readable medium comprising instructions that, when executed by a processor, cause the processor to:
calculate weights for a difference frame based on a human visual system's ability to perceive color differences between a current video frame and a motion predicted version of the current video frame, wherein the difference frame indicates differences between the current video frame and the motion predicted version of the current video frame;
apply the weights to the difference frame to produce a weighted difference frame;
determine spatial variances of the motion predicted version of the current video frame; and
restore color differences in the weighted difference frame based on the determined spatial variances.

2. The non-transitory computer-readable medium of claim 1, wherein the instructions cause the processor to calculate the weights based on the difference in a perceptual color space between each pixel in the current video frame and each corresponding pixel in the motion predicted version of the current video frame.

3. The non-transitory computer-readable medium of claim 2, wherein the instructions cause the processor to calculate the weights based on a map from differences in the perceptual color space to values between zero and one.

4. The non-transitory computer-readable medium of claim 3, wherein the map relates differences below a first value to zero and differences above a second value to one.

5. The non-transitory computer-readable medium of claim 2, wherein the instructions cause the processor to convert the current video frame and the motion predicted version of the current video frame to the perceptual color space.

6. The non-transitory computer-readable medium of claim 1, wherein the instructions to determine the spatial variances and restore color differences include instructions that cause the processor to compute a variance map based on the motion predicted version of the current video frame, multiply the variance map by the difference between the difference frame and the weighted difference frame to produce a preservation frame, and add the preservation frame to the weighted difference frame.

7. A system comprising:
a motion prediction module to:
generate a prediction of a current video frame based on spatially shifting a previous frame, and
compute a difference frame indicating differences between the current video frame and the prediction of the current video frame;
a multiplication and summation module to discard information in the difference frame unlikely to be perceived by a human visual system based on an ability of the human visual system to sense color differences indicated by the difference frame; and
transformation and encoding modules to transform, quantize, and encode the difference frame lacking the discarded information to produce an encoded, compressed frame.

8. The system of claim 7, further comprising a variance mapping module to determine information in the difference frame to preserve, wherein the multiplication and summation module is to preserve the determined information.

9. The system of claim 8, wherein the variance mapping module is to determine the information in the difference frame to preserve by multiplying a variance map by a frame indicating information to be discarded.

10. The system of claim 9, wherein the variance mapping module is to determine the variance map based on the prediction of the current video frame.

11. The system of claim 7, further comprising a color difference module to compute color differences in a perceptual color space, wherein the differences in the perceptual color space are indicative of the ability of the human visual system to sense the color differences, and wherein the multiplication and summation module is to discard the information in the difference frame unlikely to be perceived by the human visual system based on the color differences.

12. The system of claim 11, further comprising a tone map module to calculate weights to apply to the difference frame based on the color differences, wherein the multiplication and summation module is to discard the information in the difference frame unlikely to be perceived by the human visual system based on the weights.

13. The system of claim 12, wherein the tone map module calculates the weights based on a tone map including a zero-weight region, a linear region, and a fully preserved region.

14. The system of claim 7, wherein the encoding module encodes the difference frame lacking the discarded information using lossless compression.

15. A method comprising:
calculating color differences between a current video frame and a motion predicted version of the current video frame based on a human visual system's ability to perceive the color differences; and
discarding information in a difference frame based on the color differences, the difference frame comprising differences between the current video frame and the motion predicted version of the current video frame.

16. The method of claim 15, further comprising calculating a spatial variance map based on the motion predicted version of the current video frame, and adding preservation information to the difference frame lacking the discarded information based on the spatial variance map.

17. The method of claim 16, further comprising multiplying the spatial variance map by the discarded information to determine the preservation information.

18. The method of claim 15, further comprising converting the current video frame and the motion predicted version of the current video frame to a perceptual color space, wherein calculating the color differences comprises calculating the color differences in the perceptual color space, and wherein differences in the perceptual color space are indicative of the human visual system's ability to perceive the differences.

19. The method of claim 15, further comprising calculating weights based on the color differences according to a tone map, wherein discarding the information in the difference frame comprises multiplying the difference frame by the weights to produce a weighted difference frame.

20. The method of claim 19, further comprising subtracting the weighted difference frame from the difference frame to determine discarded information, and calculating preservation information based on the discarded information and a spatial variance map.

* * * * *